United States Patent Office 3,632,796
Patented Jan. 4, 1972

3,632,796
SATURATED LINEAR POLYMERS HAVING PLURAL PENDANT ETHYLENIC UNSATURATION
Donald F. Holicky, Parma, Kenneth G. Hahn, Brookpark, and Robert C. Gasman, Parma, Ohio, assignors to SCM Corporation, Cleveland, Ohio
No Drawing. Filed Feb. 11, 1969, Ser. No. 798,470
Int. Cl. C08g 41/04, 22/00
U.S. Cl. 260—77.5 CR        3 Claims

ABSTRACT OF THE DISCLOSURE

A class of polymers comprising a saturated, ester-free backbone having pendant therefrom through urethane linkage a plurality of ethylenically unsaturated groups which are polymerizable with vinyl monomer for thermosetting purposes under the influence of free radical catalysis is described along with process for preparing the copolymers.

Polymers falling within the scope of this invention are advantageous in that when thermoset, they produce shaped bodies or objects which have controlled physical properties (e.g., mechanical strength and flexibility). The polymers are further advantageous in that they are significantly more resistant to attack by solvents, acid and alkalies than are shaped objects prepared from conventional polyester polymers.

BACKGROUND OF THE INVENTION

Polyester polymers or resins constitute one of the most widely used class of thermoset polymers. Such resins are the reaction product of unsaturated polycarboxylic acids and polyols and the linear polymer chains are formed through ester linkage contained in the linear backbone which has unsaturation functionality. The resin are readily thermoset by polymerization with a copolymerizable monomer under free radical catalyis which cross-links the linear polyester backbone at its unsaturation sites within the backbone to form rigid thermoset product. Polyester resins, when thermoset, are often disadvantageous in that ester linkages in the backbone are subject to hydrolysis and the backbone is sometimes broken, opening the polymer grid to further chemical attack and decomposition. The linear polymers of the present invention are free or substantially free of ester linkages since the backbone is saturated. The unsaturated functionality through which cross-linking is accomplished to obtain thermoset resins is external to the backbone and is present in each group of a plurality of pendant groups which are attached to the saturated backbone through urethane linkage.

The backbone is an addition polymer. The linear resins have significantly higher molecular weight, that is, molecular weight ranging from 10,000 to 225,000, than the molecular weight of conventional polyester resins whose maximum weight is usually about 5,000. Such high molecular weight polymers, when thermoset, produce exceptionally durable rigid products. Thermoset products prepared from polymers falling within the scope of this invention have increased physical strength and increased solvent, acid, and alkali resistance over thermoset products prepared from conventional polyester resins.

SUMMARY OF THE INVENTION

The present invention provides a novel class of linear polymers consisting essentially of a linear, substantially ester-free, saturated backbone having pendant therefrom through urethane linkage a plurality of unsaturated groups polymerizable with vinyl monomer for thermosetting purposes. The polymers are advantageous in that their physical properties can be controlled and altered by regulating the frequency, length, and degree of unsaturation in the pendant unsaturated groups, thus permitting the production of thermoset molded products having a wide diversity of improved physical properties. For example, when the backbone contains a relatively large plurality of pendant ethylenically unsaturated groups, the resultant linear polymer, when cross-linked, will produce highly rigid products. On the other hand, when the backbone contains a smaller number of pendant groups having unsaturation, the polymer will tend to be flexible and exhibit good flexural strength.

The polymers are further advantageous in that they produce molded products which have significantly greater tensile strength than thermoset polyester products and further, have usually high resistance to chemical attack by solvents, acids, and alkalies.

The saturated linear polymer backbone is an addition polymer and is formed from any of a wide variety of combinations of ethylenically unsaturated monomers. However, one of the monomers must be an ethylenically unsaturated isocyanate in order to provide the urethane linkage through which the unsaturated groups are attached to the backbone. Monomers other than ethylenically unsaturated isocyanates which can form the backbone of the polymers of this invention are combinations of those selected from the class consisting of ethylenically unsaturated substituted and unsubstituted hydrocarbons, ethylenically unsaturated esters of organic and inorganic acids, ethylenically unsaturated halides, and ethylenically unsaturated nitriles.

Ethylenically unsaturated hydrocarbons which can form a portion of the backbone or addition polymer include aliphatic hydrocarbons, for example, ethylene, propylene, butylene, amylene, isoprene, hexylene, heptylene, octylene, and the like. Other ethylenically unsaturated hydrocarbons which can form the backbone include aromatic hydrocarbons, for example, monovinylidene aromatic hydrocarbons such as styrene, $\alpha$-methyl styrene, vinyl toluene, and their halo-substituted counterparts.

Ethylenically unsaturated carboxylic acid esters of organic and inorganic acids include esters of unsaturated carboxylic acids such as, for example, alkyl acrylates including ethyl acrylate, propyl acrylate, butyl acrylate, pentyl acrylate, ethyl hexyl acrylate, and the corresponding methacrylates as well as saturated carboxylic acid esters of ethylenically unsaturated alcohols, for example, vinyl acetate, vinyl butyrate, allyl acetate, and their halo-substituted counterparts.

Ethylenically unsaturated organic halides which can be incorporated into the backbone include vinyl halides and halo-substituted aromatic hydrocarbons, for example, vinyl chloride, allyl chloride, chloro styrene, chloromethyl styrene, and the like.

Ethylenically unsaturated nitriles which may form a portion of the backbone addition polymer include, for example, acrylonitrile, methacrylonitrile, and the like.

Polymers falling within the class of this invention contain at least one and sometimes can contain several of the monomers falling within the above-mentioned classes provided, however, that an ethylenically unsaturated isocyanate is one of the monomers forming the polymer backbone.

Ethylenically unsaturated isocyanates which form a portion of the backbone of the polymers of this invention can be any isocyanate containing an unsaturated polymerizable substituent. Examples of ethylenically unsaturated isocyanates which can be employed include allyl isocyanate, isopropenyl isocyanate, 4-isocyanato-styrene, vinyl naphthalene isocyanate, 5-isocyanato-pentene-1, and the like.

Other unsaturated isocyanates are isocyanate esters of α,β-ethylenically unsaturated carboxylic acids and include bis - (2 - isocyanato-ethyl) fumarate, bis-(2-isocyanato-ethyl) maleate, isocyanato ethyl acrylate, isocyanato propyl methacrylate, 1-methyl benzene-2-isocyanato-4-carbamic ester propyl methacrylate, bis-(2-isocyanato-1-methyl benzene-4-carbamic ester propyl) maleate and the corresponding fumarate ester and the like. The three last-mentioned esters are unsaturated urethane esters having terminal isocyanate groups.

When the unsaturated isocyanates are isocyanate esters of α,β-ethylenically unsaturated carboxylic acids, the isocyanate groups will be pendant from the backbone through ester linkage, wherein the ester linkage is pendant from but proximal to the backbone and the urethane linkage is in the same pendant group but is distal to the backbone. Surprisingly, although ester linkages are often subject to chemical attack, for example, by hydrolysis, linear polymers having pendant ester-isocyanate groups can be reacted to form urethane linkages and such linear polymers when cross-linked, will form thermoset products which are substantially inert to chemical attack.

The linear saturated backbone has isocyanate groups pendant therefrom and when such polymer is reacted with a hydroxyl substituted ethylenically unsaturated organic compound, for example, an unsaturated alcohol, there is formed a plurality of pendant unsaturated groups linked to the backbone through urethane linkage.

The linear saturated backbone is conventionally prepared by polymerizing a mixture of the desired monomers under conditions of free radical polymerization in a hereinafter defined liquid organic diluent. Such copolymers, when polymerized with a copolymerizable monomer, form shaped or molded objects which are highly resistant to attack by organic solvents, acids and alkalies.

The term "hydroxyl substituted ethylenically unsaturated compounds" as used herein is intended to mean and to include ethylenically unsaturated alcohols and hydroxy substituted ethylenically unsaturated esters.

Hydroxyl substituted ethylenically unsaturated compounds which can be employed to form the plurality of pendant unsaturated groups which are attached to the polymer backbone through urethane linkage include allyl alcohol, crotyl alcohol, α-methyl allyl alcohol, methallyl alcohol, chloro, allyl alcohol, β-methyl crotyl alcohol, β-croto methallyl alcohol, and the like.

Other hydroxy substituted ethylenically unsaturated organic compounds which can form the pendant unsaturated groups through urethane linkage are hydroxyethyl acrylate, hydroxypropyl acrylate, hydroxypropyl and ethyl methacrylate, hydroxyethyl crotonate, hydroxypropyl crotonate; acrylic and methacrylic acid esters of monohydric alcohol glycidyl ethers, dihydroxyalkyl or monohydroxyalkyl maleate and fumarate esters of monohydric alcohol glycidyl ethers. Still other hydroxyl substituted ethylenically unsaturated organic compounds include hydroxy lower alkyl esters of vinylacetic, tiglic, angelic, senecioic, tetraacrylic, hypogeic, oleic, elaidic, errucic, brassidic, and behenic acids.

Examples of hydroxy lower alkyl esters of ethylenically unsaturated dicarboxylic acids include hydroxy lower alkyl esters of glutaconic, citraconic, itaconic, ethidene malonic, mesaconic, allyl malonic, propylidene malonic, hydromuconic, pyrocinconic, allyl succinic, carbocaprolactonic, and tetracrylic acids.

Advantageous polymers falling within the class of this invention are those in which the backbone comprises an addition polymer of from about 70 to about 90 weight percent of vinyl aromatic hydrocarbon and from about 30 to about 10 weight percent of an ethylenically unsaturated isocyanate. The vinyl aromatic hydrocarbon can be styrene, α-methyl styrene, chloro methyl styrene, vinyl toluene, or the like, and the ethylenically unsaturated isocyanate can be one of any of those hereinbefore described. In these polymers, the plurality of pendant ethylenically unsaturated groups are residues of ethylenically unsaturated hydroxyl compounds which have been reacted with the pendant isocyanate to form the urethane linkage.

Another advantageous embodiment of a linear polymer is one where the backbone contains from about 80 to about 10 weight percent based on the weight of the polymer of vinyl aromatic hydrocarbon, from about 10 to about 60 weight percent of an unsaturated nitrile, and from about 10 to about 30 weight percent of an ethylenically unsaturated isocyanate.

Still another advantageous embodiment of a linear polymer falling within the scope of this invention is one where the backbone contains from about 80 to about 10 weight percent, based on the weight of the polymer of vinyl aromatic hydrocarbon, from about 10 to about 60 weight percent of an alkyl acrylate, for example, methyl acrylate, ethyl acrylate, propyl acrylate, ethyl hexyl acrylate, methyl methacrylate, ethyl methacrylate, and the like and from about 10 to about 30 weight percent of an ethylenically unsaturated isocyanate. In these polymers, the plurality of pendant ethylenically unsaturated groups are residues of ethylenically unsaturated hydroxyl compounds which have reacted with the isocyanate to form the urethane linkages.

The foregoing polymers, when reduced and copolymerized with copolymerizable vinyl monomers, produce shaped objects having the advantageous properties hereinbefore amount of copolymerizable monomer employed to form cross-linkable polymer solutions can vary widely from between about 5 to about 95 weight percent but is preferably in the range of between about 30 to about 70 weight percent, based on the weight of the total solution. If less than 30% copolymerizable monomer is employed, the solutions may sometimes form gels on standing. Although more than 70 weight percent copolymerizable monomer may be employed, there is usually no advantage and cross-linked products prepared therefrom may lose some resistance to solvents, acids, and alkalies.

The present invention also provides a class of novel thermosettable resin compositions comprising:

(A) from about 5 to 95 weight percent of an ester-free linear saturated backbone having pendant therefrom through urethane linkage a plurality of unsaturated groups polymerizable with vinyl monomer for thermosetting purposes, (B) from about 95 to about 5 weight percent of said vinyl monomer, and (C) a minute amount of an inhibitor.

In the foregoing compositions, the linear copolymer having a plurality of ethylenically unsaturated groups can be any of those hereinbefore described.

The vinyl monomer can be one or more of liquid polymerizable organic compounds having vinyl unsaturation such as, for example, styrene, α-methyl styrene, chloro styrene, and ethylenically unsaturated hydroxy lower alkyl adducts of isocyanates such as, for example, the hydroxypropyl methacrylate adduct of toluene diisocyanate.

The inhibitor employed is any conventional inhibitor, (a particular example being hydroquinone) which will prevent the initiation of free radical polymerization during storage.

The foregoing compositions are liquid and are advantageous in that they can be poured into molds and cured using any of the hereinbefore described free radical catalyst to form rigid thermoset resin products which have high tensile strength and flexibility which can be controlled by regulating the frequency of pendant unsaturated groups. The thermoset products are highly resistant to attack by acids, alkalies, and organic solvents.

The present invention also provides a novel process for preparing the linear polymers of this invention which comprises the steps of:

(A) forming a reaction mixture consisting essentially of:

(1) a liquid organic diluent;
(2) at least one monomer selected from the group consisting of:
   (a) ethylenically unsaturated substituted and unsubstituted hydrocarbons;
   (b) substituted and unsubstituted ethylenically unsaturated esters of an unsaturated alcohol and a saturated organic or inorganic acid or the ester of a saturated alcohol and an $\alpha,\beta$-ethylenically unsaturated carboxylic acid;
   (c) ethylenically unsaturated organic halides;
   (d) ethylenically unsaturated nitriles;
(3) an ethylenically unsaturated isocyanate; and
(4) a free radical polymerization catalyst;

(B) heating said mixture with agitation under liquid phase conditions in an inert atmosphere at a temperature between about 140° F. and about 250° F. until a linear saturated substantially ester-free polymer is formed containing isocyanate groups external to said backbone, said polymer being dispersed in said diluent;

(C) adding to the dispersion so formed a hydroxyl substituted ethylenically unsaturated organic compound in an amount sufficient to react with substantially all of said isocyanate groups to form a urethane linkage between said ethylenically unsaturated organic compound and said linear polymer backbone;

(D) heating the resultant mixture at a temperature between about 100° F. and 160° F. for a time sufficient to form a substantially ester-free backbone containing through urethane linkage a plurality of external pendant unsaturated groups.

The term "free radical polymerization catalyst" as used herein is intended to mean and to refer to organic per compounds, for example, lauroyl peroxide, benzoyl peroxide, methyl ethyl ketone peroxide, tertiary butyl perbenzoate, and the like.

The reaction mixture is suitably formed by adding the liquid organic diluent into a reaction zone which is maintained in an inert atmosphere by a blanket of inert gas such as, for example, nitrogen, helium, argon, or krypton. To the reaction diluent, there is added with agitation the monomers and the polymerization catalyst which are dispersed in the liquid organic diluent.

The reaction mixture is maintained at a temperature preferably between about 150° F. and 270° F. and is continuously agitated during the addition of the monomers. By so proceeding, there is formed a linear saturated ester-free addition polymer which comprises the backbone of the polymer of this invention. The reaction which forms the addition polymer is exothermic and the temperature of the reaction mixture is controlled through agitation, cooling means, or by regulating the rate of addition of the monomers to the diluent. Although temperatures below about 150° F. may be employed, there is usually no advantage and polymerization times are unduly prolonged. Although temperatures above 270° F. can be sometimes employed, there is danger that the molecular weight will sometimes become so low that the desirable properties of the final cured product will be lost. The preferred temperature range will generally depend upon the boiling point of the liquid organic diluent. When an inert diluent is employed, the reaction is run at reflux under liquid phase conditions.

When a hereinafter defined reactive diluent is used, the temperatures can be somewhat lower. The amount of time required to add the monomers to the reaction zone is from between about 1 to about 5 hours and polymerization times usually require an additional 5 to 7 hours in order to insure complete polymerization of the monomers. Completion of polymerization can be readily ascertained by withdrawing an aliquot and determining the total percentage of solids in the aliquot. When the percentage of total solids (non-volatile materials) is substantially equal to the weight percent of polymerizable monomers added to the reaction zone, the polymerization is complete.

As will be hereinafter evident from the specific examples, the total amount of monomer mixture employed in the formation of the backbone will be from about 5 to about 70 weight percent, based on the weight of the reaction mixture. The total amount of monomer mixture employed will depend upon the nature and degree of plurality of functional pendency in the plurality of pendant unsaturated groups and the procedures employed in attaching the plurality of ethylenically unsaturated groups to the backbone.

The inert liquid organic diluent which can be employed in the process of this invention can be any of a wide variety of liquid organic diluents having boiling points in the ranges of 50 to 500° F. Examples of such liquids include, for example, tetrahydrofuran, xylene, benzene, and ligroin. When an inert diluent is used, it is usually necessary to strip the liquid from the polymer prior to reducing the polymer with a copolymerizable monomer. As noted above, a reactive diluent can also be employed and is a liquid isocyanate.

Employment of a reactive diluent is often advantageous since it makes possible the preparation of the copolymerizable monomer in situ and simultaneously with the pendency of the ethylenically unsaturated groups to the polymer backbone through urethane linkage and eliminate the necessity of the stripping step which is necessary when most inert diluents are employed.

The reactive diluent which can be employed in the practice of this invention can be any saturated isocyanate (i.e., isocyanates without unsaturated functionality). Examples of such isocyanates include toluene diisocyanate, xylene diisocyanate, cyclohexane diisocyanate, hexamethylene diisocyanate, isophorone diisocyanate, lysine diisocyanate, phenyl isocyanate, 4,4'-isocyanato diphenyl methane, etc.

The addition of the unsaturated hydroxyl substituted ethylenically unsaturated compound to the reaction mixture after the formation of the backbone will form the plurality of unsaturated groups on the backbone, thus forming the polymers of this invention. The hydroxy substituted compound will also react with the isocyanate to form a vinyl urethane monomer which will readily crosslink with the linear polymers to form rigid chemically-resistant thermoset polymer products.

The following specific examples are intended to illustrate the invention but not to limit the scope thereof, parts and percentages being by weight unless otherwise specified.

EXAMPLE 1

To a 5 liter reaction vessel equipped with a thermometer, gas valve, inlet funnels, electrical heating coils, mechanical agitator and a reflux condenser, there was introduced 170 grams of tetrahydrofuran. Thereafter, the temperature of the tetrahydrofuran was raised to 140° F., and there was added under a blanket of nitrogen a mixture of 260 grams styrene, 80 grams of methacrylonitrile, and 9 grams of benzoyl peroxide. Simultaneously through a separate funnel, 100 grams of styrene isocyanate dispersed in an additional 170 grams tetrahydrofuran were introduced into the reactor. All reactants were slowly added to the reaction vessel over a 4 hour period. The reactor contents were continuously agitated and nitrogen gas was continuously sparged through the reactor during the addition. The contents of the reaction vessel which comprised a reaction mixture of the components above described was held at 140° F. for an additional 6 hours after all of the components had been added to the reaction vessel. During this period, there was formed a linear, saturated ester-free backbone containing a plurality of isocyanate groups pendant from the backbone. The reactor was then cooled and there was added 690 grams of styrene containing .6 gram of quinone, the latter serving as an inhibitor. The tetrahydrofuran was removed from the bulk of the liquid phase of the reaction mixture by stripping in vacuo at a temperature of 125° F. The temperature of the reaction mixture was then raised to 130° F., and there was added, while nitrogen was continuously sparged through the reactor and the reaction mixture was continuously agitated, 40 grams of allyl alcohol. The addition was carried out over a 4 hour period after which there was formed a linear polymer consisting of an unsaturated ester-free backbone having pendant therefrom through urethane linkage a plurality of ethylenically unsaturated groups. The linear polymer was dispersed in styrene. The polymer had an average molecular weight of approximately 30,000 as determined by gel phase chromatographic techniques.

Cured films of the polymeric resin solution were prepared by adding 2 grams of a free radical polymerization catalyst to 400 grams of the solution and pouring the solution between glass plates and curing at 200° F. to provide a thermoset polymer sheet. These were set aside for further evaluation as set forth in Example 9.

EXAMPLE 2

To a 5 liter reaction vessel of Example 1, there was added 170 grams of phenyl isocyanate. Thereafter, the temperature of the phenyl isocyanate was raised to 215° F. and there was added under a blanket of nitrogen a mixture of 260 grams styrene, 80 grams methacrylonitrile, and 9 grams benzoyl peroxide. Simultaneously through a separate funnel, there was introduced 52 grams of allyl isocyanate which had been previously dispersed in 170 grams of phenyl isocyanate. The addition was carried out over a 4 hour period during which time the contents of the reactor were continuously agitated, and nitrogen gas was continuously sparged through the reactor. Finally, the product was reduced in 690 grams of styrene containing .3 gram of quinone. The contents of the reaction vessel comprised a reaction mixture containing the above-described components and was held at 250° F. for an additional 6 hour period following the completion of the addition of the components to the reaction vessel. There was thus formed a substantially linear saturated ester-free backbone containing a plurality of reactive isocyanate groups pendant therefrom, dispersed in phenyl isocyanate. The reactor was then cooled to 130° F. and 202 grams of allyl alcohol were added over a period of 4 hours. By so proceeding, there was formed a linear ester-free saturated backbone having dependent therefrom a plurality of unsaturated groups linked to the backbone through urethane linkage. The linear polymer was dispersed in the allyl alcohol adduct of phenyl isocyanate which consisted essentially of an unsaturated copolymerizable urethane monomer to which .1 gram of quinone were added to prevent premature cross-linking. The polymer had an average molecular weight of approximately 25,000 as determined by gel phase chromatographic techniques.

The polymer was converted to a thermoset film using the procedure described in Example 1 and the film was set aside for further evaluation as described in Example 9.

EXAMPLE 3

To the reaction vessel of Example 1, there was added 341 grams of toluene diisocyanate. Thereafter, while nitrogen was continuously sparged through the reactor and while the contents were continuously agitated, there was added a mixture of 520 grams styrene, 160 grams methacrylonitrile, and 18 grams benzoyl peroxide. Simultaneously through a separate funnel, there was introduced a solution consisting essentially of 340 grams of toluene diisocyanate and 216 grams of 1-methyl benzene-2-isocyanato-4-carbamic ester propyl methacrylate. The last-mentioned compound was the hydroxypropyl methacrylate mono adduct of toluene diisocyanate. The reactants were added to the reaction vessel over a 4 hour period while the nitrogen gas sparge and agitation was continuously maintained. The resulting mixture was held at 250° F. for an additional 6 hours after all of the components had been added to the reaction vessel. Finally, the product was reduced in styrene, 1380 grams, containing .6 grams of quinone. The contents of the reactor then consisted essentially of a linear substantially ester-free backbone having a plurality of pendant isocyanate groups attached to the backbone through ester linkage and dispersed in toluene diisocyanate. There was then added to the mixture .6 grams of quinone. Thereafter, the temperature of the contents of the reactor was raised to 140° F., and 1466 grams of hydroxypropyl methacrylate were added to the mixture over 4 hours. Also, during this addition, the nitrogen sparge and agitation were maintained. The heating was continued for 5 hours and the product obtained consisted substantially of a linear polymer having the above-mentioned backbone and a plurality of ethylenically unsaturated groups pendant from the backbone, each through a distal urethane linkage and a proximal ester linkage. The polymer had an average molecular weight of approximately 25,000 as determined by gel phase chromatographic techniques. The polymer was dispersed in the dihydroxypropyl methacrylate adduct of toluene diisocyanate. A 100 gram sample of the above material was poured between two glass plates after the addition of 1 gram of benzoyl peroxide and cured at 200° F. to form a thermoset film which was set aside for further evaluation as described in Example 9.

EXAMPLE 4

The procedure of Example 1 was repeated except that isopropenyl isocyanate was employed instead of the styrene isocyanate used in that example. A liquid product visually similar to that obtained in Example 1 was produced. A thermoset film was also made from this product using the procedure described in Example 1 and this film was set aside for evaluation as described in Example 9.

EXAMPLE 5

The procedure of Example 1 was repeated except that after the addition of the hydroxypropyl methacrylate, 1,380 grams of styrene containing 0.6 gram of quinone were added to the liquid polymer dispersion. The resulting product was a transparent liquid in which the linear polymer described in Example 3 was dispersed in a mixture of the toluene diisocyanate di-adduct and styrene. A thermoset film was prepared using the procedure described in Example 3 and set aside for evaluation as shown in Example 9.

EXAMPLE 6

The procedure of Example 3 was repeated except that hydroxyethyl acrylate was employed in place of the hydroxypropyl methacrylate used in that example. A liquid product visually similar to that of Example 3 was obtained. A thermoset film was also made from this product using the procedure described in Example 1 and this film was set aside for further evaluation as described in Example 9.

EXAMPLE 7

The procedure of Example 3 was repeated except that crotyl alcohol was used in place of the hydroxypropyl methacrylate employed in that example. A liquid product visually similar to that obtained in Example 3 was produced. A thermoset film, prepared using the procedure described in Example 1, was set aside for evaluation as described in Example 9.

EXAMPLE 8

To the 5 liter reaction vessel described in Example 1, there was introduced 170 grams of tetrahydrofuran. Thereafter, the temperature of the tetrahydrofuran was raised to 140° F. and there was added under a blanket of nitrogen a mixture of 260 grams styrene, 80 grams methacrylonitrile, and 1.5 grams azo-bis-butyronitrile (a polymerization catalyst). Simultaneously, through a separate funnel, 100 grams of styrene isocyanate dispersed in an additional 170 grams as tetrahydrofuran was introduced into the reactor. All reactants were slowly added to the reaction vessel over a 4 hour period. The contents of the reactor were continuously agitated and nitrogen gas was continuously sparged through the reactor during the addition. The contents of the reaction vessel comprised a reaction mixture of the components described above and was held at 140° F. for an additional 6 hours after all the components had been added. During this period, there was formed a linear saturated ester-free backbone containing a plurality of isocyanate groups pendant from the backbone. The reactor was then cooled and there was then added 690 grams of styrene containing 0.6 grams of quinone, the latter serving as an inhibitor. The tetrahydrofuran was removed from the bulk of the liquid phase of the reaction mixture by stripping in vacuo at a temperature of 125° F.

The temperature of the reaction mixture was then raised to 130° F. and there was added with agitation and while nitrogen was continuously sparged through the reactor, 40 grams of allyl alcohol. The reaction was carried out over a 4 hour period after which there was formed a linear polymer consisting of an unsaturated ester-free backbone having pendant therefrom through urethane linkage a plurality of ethylenically unsaturated groups. The linear polymer was dispersed in styrene and had an average molecular weight of approximately 85,000 as determined by gel phase chromatographic techniques. A cured film was cast following the procedure of Example 1 and set aside for evaluation as described in Example 9.

EXAMPLE 9

The cured cast films prepared from the polymers of Examples 1 through 8 were tested for chemical resistance and compared with two commercially produced polyester resins. The films were weighed prior to and after immersion with 3.0 N nitric acid, 1.2 N sodium hydroxide, methyl ethyl ketone and benzene for 24 hours. In every instance, the loss of weight of the cast films of the polymers of Examples 1 through 8 was significantly less than cured commercial polyester films which had been accorded the same treatment.

The thermosetable resin compositions of this invention are conventionally cured under conditions of free radical catalysis. They are useful in making fiber glass reinforced plastic products, and such products usually require less fiber glass. The compositions can be employed to form low density foamed plastic products and such products can be conventionally obtained by curing the compositions in the presence of a blowing agent.

This application contains subject matter related to that contained in five copending patent applications Ser. Nos. 798,439; 798,458; 798,461; and 798,469, filed simultaneously with the instant application and assigned to the same assignee.

What is claimed is:

1. The process of preparing a copolymer consisting of a substantially ester-free linear saturated backbond having pendant therefrom, through urethane linkage, a plurality of unsaturated groups polymerizable with vinyl monomer for thermosetting purposes which comprises the steps of:
   (A) forming a reaction mixture consisting essentially of
      (1) a strippable liquid organic diluent
      (2) from about 5 to about 95 weight percent, basis the weight of the backbone, of at least one monomer selected from the group consisting of
         (a) $\alpha,\beta$-mono ethylenically unsaturated substituted and unsubstituted hydrocarbons
         (b) $\alpha,\beta$-mono ethylenically unsaturated esters of organic and inorganic acids
         (c) halides of ethylenically unsaturated organic alcohols having no additional functionality and
         (d) $\alpha,\beta$-mono ethylenically unsaturated nitriles and
      (3) from about 30 to about 5 weight percent, basis the weight of the backbone, of an ethylenically unsaturated isocyanate containing a single unreacted isocyanate group and
      (4) a free-radical polymerization catalyst;
   (B) heating said mixture, with agitation, under liquid phase conditions in an inert atmosphere at a temperature and for a time sufficient to form a linear saturated, substantially ester-free polymer containing isocyanate functionality external to and pendant from said backbone, said polymer being dispersed in said diluent;
   (C) adding to the dispersion so formed, with agitation, a substantially stoichiometric amount of a hydroxyl substituted $\alpha,\beta$-mono ethylenically unsaturated compound
   (D) heating the resultant mixture at a temperature and for a time sufficient to react the isocyanate groups pendant from said backbone with the hydroxyl groups of the hydroxyl-substituted $\alpha,\beta$-mono ethylenically organic compound to form a linear copolymer having a substantially inert backbone and containing, through urethane linkage, a plurality of pendant ethylenically unsaturated groups and
   (E) recovering said copolymer from said diluent.

2. The process of claim 1 wherein said ethylenically unsaturated isocyanate is 1-methylbenzene, 2-isocyanato-4-carbamic ester propyl methacrylate.

3. The process of claim 1 wherein said ethylenically unsaturated isocyanate is selected from a class consisting of bis(1-methylbenzene,2-isocyanato-4-carbamic ester propyl) maleate and the corresponding fumarate ester.

References Cited
UNITED STATES PATENTS

| | | | |
|---|---|---|---|
| 3,297,745 | 1/1967 | Fekete | 260—77.5 |
| 3,304,273 | 2/1967 | Stamberger | 260—77.5 |
| 3,317,635 | 5/1967 | Osmond | 260—836 |
| 3,382,297 | 5/1968 | Thompson | 260—875 |
| 3,383,351 | 5/1968 | Stamberger | 260—77.5 |
| 3,451,952 | 6/1969 | Slocombe | 260—77.5 |
| 3,505,252 | 4/1970 | Brotherton | 260—859 |
| 3,509,234 | 4/1970 | Burlant | 260—859 |

PAUL LIEBERMAN, Primary Examiner

U.S. Cl. X.R.

260—78.5 BB, 78.5 R, 859 R; 878 R; 881, 884, 885, 886